(12) United States Patent
Jimenez-Rios et al.

(10) Patent No.: US 11,116,206 B2
(45) Date of Patent: Sep. 14, 2021

(54) CRYOCONTAINER

(71) Applicant: Cook Medical Technologies LLC, Bloomington, IN (US)

(72) Inventors: Jorge L. Jimenez-Rios, Bloomington, IN (US); Lyle D. Hundley, Bloomington, IN (US); Victor W. Havill, Bloomington, IN (US); Erin Elizabeth Roberts, Bloomington, IN (US); Jaimie Michelle Jarboe, Bloomington, IN (US)

(73) Assignee: Cook Medical Technologies LLC, Bloomington, IN (US)

( * ) Notice: Subject to any disclaimer, the term of this patent is extended or adjusted under 35 U.S.C. 154(b) by 49 days.

(21) Appl. No.: 16/584,458

(22) Filed: Sep. 26, 2019

(65) Prior Publication Data

US 2020/0100494 A1      Apr. 2, 2020

Related U.S. Application Data

(60) Provisional application No. 62/739,683, filed on Oct. 1, 2018.

(51) Int. Cl.
*A01N 1/02* (2006.01)
*G01N 1/42* (2006.01)

(52) U.S. Cl.
CPC ......... *A01N 1/0268* (2013.01); *A01N 1/0242* (2013.01); *G01N 1/42* (2013.01)

(58) Field of Classification Search
None
See application file for complete search history.

(56) References Cited

U.S. PATENT DOCUMENTS

| 4,799,358 A | 1/1989 | Knopf et al. |
| 5,190,880 A | 3/1993 | Cassou et al. |

(Continued)

FOREIGN PATENT DOCUMENTS

| AU | 2009200073 B2 | 5/2012 |
| CN | 108 541 702 A | 9/2018 |

(Continued)

OTHER PUBLICATIONS

Biotech Inc. Brochure, "CRYOLOCK™—A Versatile System for Vitrification of Human and Animal Oocytes and Embryos", Device was on sale before priority date of application, 2 pages.

(Continued)

*Primary Examiner* — William H. Beisner
(74) *Attorney, Agent, or Firm* — Crowell & Moring LLP

(57) ABSTRACT

A sealable container for preservation of a biological sample is provided. The container includes a cap comprising a proximal open and a lumen and an elongate body that extends from a handle portion to a specimen portion. A closure portion is disposed between the handle portion and the specimen portion, wherein the closure portion is configured to make surface to surface contact with the cap when the specimen portion is fully inserted within the lumen. The closure portion comprises an outer diameter that gradually decreases in a direction from the handle portion to the specimen portion. The specimen portion comprises a scooped portion where a distance between the upper surface and the lower surface is less than distances between the upper surface and the lower surface along remaining portions of the specimen portion, wherein the scooped portion is spaced proximally from a distal tip of the specimen portion.

11 Claims, 7 Drawing Sheets

(56) References Cited

U.S. PATENT DOCUMENTS

| | | |
|---|---|---|
| 5,545,562 A | 8/1996 | Cassou et al. |
| 6,304,485 B1 | 10/2001 | Harari et al. |
| 6,337,205 B1 | 1/2002 | Wisniewski |
| 6,393,860 B1 | 5/2002 | Heschel et al. |
| 6,467,285 B2 | 10/2002 | Felder et al. |
| 6,472,036 B2 | 10/2002 | Saint-Ramon et al. |
| 6,500,608 B2 | 12/2002 | Forest et al. |
| 6,514,216 B2 | 2/2003 | Inoue et al. |
| 6,581,395 B2 | 6/2003 | Felder et al. |
| 6,688,123 B2 | 2/2004 | Felder et al. |
| 6,758,362 B2 | 7/2004 | Studer |
| 6,858,424 B2 | 2/2005 | Wisniewski |
| 6,945,056 B2 | 9/2005 | Brown et al. |
| 7,087,370 B2 | 8/2006 | Forest et al. |
| 7,104,074 B2 | 9/2006 | Voute et al. |
| 7,228,688 B2 | 6/2007 | Voute et al. |
| 7,232,618 B2 | 6/2007 | Yamada et al. |
| 7,232,681 B2 | 6/2007 | O'Connell |
| 7,316,896 B2 | 1/2008 | Kuwayama et al. |
| 7,353,658 B2 | 4/2008 | Voute et al. |
| D583,066 S | 12/2008 | Afifiyan et al. |
| 7,501,231 B2 | 3/2009 | Staines et al. |
| 7,634,917 B2 | 12/2009 | Fuhr et al. |
| 7,887,758 B2 | 2/2011 | Ostgaard et al. |
| 7,939,316 B2 | 5/2011 | Woods et al. |
| 7,947,497 B2 | 5/2011 | Yoon et al. |
| 8,028,532 B2 | 10/2011 | Voute et al. |
| 8,222,027 B2 | 7/2012 | Woods et al. |
| 8,372,633 B2 | 2/2013 | Clairaz et al. |
| 8,550,273 B2 | 10/2013 | Levin et al. |
| 8,685,637 B2 | 4/2014 | Ostermeier et al. |
| 8,936,905 B2 | 1/2015 | Woods et al. |
| D727,527 S | 4/2015 | Tao |
| 9,228,925 B2 | 1/2016 | Kim et al. |
| D748,813 S | 2/2016 | Ishiguro et al. |
| 9,297,499 B2 | 3/2016 | Jimenez-Rios et al. |
| D768,868 S | 10/2016 | Inoue |
| 9,516,876 B2 | 12/2016 | Inoue |
| 9,518,898 B2 | 12/2016 | Jimenez-Rios |
| 9,538,746 B2 | 1/2017 | Inoue |
| 9,538,747 B2 | 1/2017 | Inoue |
| 9,700,038 B2 | 7/2017 | Stojanov |
| 9,725,694 B2 | 8/2017 | Edinger et al. |
| 2002/0115054 A1 | 8/2002 | Forest et al. |
| 2003/0113706 A1 | 6/2003 | Forest et al. |
| 2004/0259072 A1 | 12/2004 | Kuwayama et al. |
| 2005/0037329 A1 | 2/2005 | Zimmermann et al. |
| 2005/0287512 A1 | 12/2005 | Cullis et al. |
| 2006/0131196 A1 | 6/2006 | Fuhr et al. |
| 2006/0134596 A1 | 6/2006 | Sjogren et al. |
| 2006/0234204 A1 | 10/2006 | Forest et al. |
| 2007/0267419 A1 | 11/2007 | Fuhr et al. |
| 2008/0003561 A1 | 1/2008 | Woods et al. |
| 2008/0023633 A1 | 1/2008 | Mittleman et al. |
| 2009/0081782 A1 | 3/2009 | Yoon et al. |
| 2009/0123996 A1 | 5/2009 | Chin |
| 2009/0148934 A1 | 6/2009 | Woods et al. |
| 2010/0003662 A1 | 1/2010 | Kagawa et al. |
| 2010/0151570 A1 | 6/2010 | Kader et al. |
| 2010/0196873 A1 | 8/2010 | Woods |
| 2010/0317108 A1 | 12/2010 | Stojanov |
| 2011/0120148 A1 | 5/2011 | Yoshimura et al. |
| 2011/0275153 A1 | 11/2011 | Butler et al. |
| 2012/0251999 A1 | 10/2012 | Demirci et al. |
| 2013/0157362 A1 | 6/2013 | Du et al. |
| 2014/0158695 A1 | 6/2014 | Jimenez-Rios |
| 2014/0212962 A1 | 7/2014 | Inoue |
| 2014/0234956 A1 | 8/2014 | Inoue |
| 2015/0024487 A1 | 1/2015 | Cheng et al. |
| 2015/0087056 A1 | 3/2015 | Pelle Meddahi et al. |
| 2015/0327887 A1 | 11/2015 | Inoue |
| 2016/0174545 A1 | 6/2016 | Parra et al. |
| 2016/0363362 A1 | 12/2016 | Chen et al. |
| 2016/0363363 A1 | 12/2016 | Chen et al. |
| 2017/0121660 A1 | 5/2017 | Jinno et al. |
| 2017/0156312 A1 | 6/2017 | Farrington et al. |
| 2017/0164606 A1 | 6/2017 | Suzuki et al. |
| 2017/0265457 A1 | 9/2017 | Suzuki et al. |
| 2017/0280708 A1 | 10/2017 | McLaughlin |
| 2018/0214179 A1 | 8/2018 | Inoue et al. |

FOREIGN PATENT DOCUMENTS

| | | |
|---|---|---|
| DE | 102 51 722 A1 | 5/2004 |
| EP | 2 471 359 A1 | 7/2012 |
| EP | 2 804 475 B1 | 2/2017 |
| JP | 2001-252293 A | 9/2001 |
| JP | 2002-315573 A | 10/2002 |
| JP | 5278978 B2 | 9/2013 |
| WO | WO 2011/070973 A1 | 6/2011 |
| WO | WO 2013/098825 A1 | 7/2013 |
| WO | WO 2014/057148 A2 | 4/2014 |
| WO | WO 2014/106286 A1 | 7/2014 |
| WO | WO 2016/040063 A1 | 3/2016 |
| WO | WO 2016/100962 A1 | 6/2016 |
| WO | WO 2016/193630 A1 | 12/2016 |
| WO | WO 2017/014513 A1 | 1/2017 |

OTHER PUBLICATIONS

Biotech Inc. Brochure, "CRYOLOCK™—Your Closed System Device for Vitrification of 1-cell Embryos", Device was on sale before priority date of application, 1 page.

"Cryolock—Orange", Irvine Scientific, Device was on sale before priority date of application, 1 page, available at http://www.irvinesci.com/products/cryolock-orange.

"Cryolock—Blue" About, Irvine Scientific, Device was on sale before priority date of application, 1 page, available at http://www.irvinesci.com/products/cryolock-blue.

"Cryolock—Blue" Documents, Irvine Scientific, Device was on sale before priority date of application, 2 page, available at http://www.irvinesci.com/products/cryolock-blue.

"VitriGuard™ Carrier—Designed for Optimal Storage", CooperSurgical Fertility Company, Device was on sale before priority date of application, 4 page, available at http://www.origio.com/products/vitriguard.

VitriGuard Brochure, "ORIGIO Vitrification—A Full Range of Vitrification Products", Device was on sale before priority date of application, 4 pages.

VitriGuard Brochure, "VitriGuard™—Carrier—Designed for Optimal Storage", Device was on sale before priority date of application, 2 pages.

PGD & PGS Brochure, "Embryo Biopsy—The Full Solution for Efficient and Effective Biopsy Pricedures", CooperSurgical Fertility Companies, 2017, 5 pages.

"Vitrification of Oocytes & Embryos—Maximize Success with a Versatile Cryopreservation System," IrvineScientific, 2017, 12 pages.

International Search Report and Written Opinion for PCT/US2019/053477, dated Jan. 14, 2020, 15 pages.

CRYOCONTAINER

CROSS-REFERENCE TO RELATED APPLICATIONS

This application claims priority from U.S. Provisional Application No. 62/739,683, filed on Oct. 1, 2018, the entirety of which is hereby fully incorporated by reference herein.

BACKGROUND

The device described in this specification relates to devices provided for retaining a biological sample for long term cryopreservation within a cryocontainer. The device may be used for vitrification, specifically vitrification of embryos or oocytes or other biological material, such as in conjunction with or in preparation for IVF cycles.

BRIEF SUMMARY

A representative embodiment of the disclosure is provided. The embodiment includes a sealable container for preservation of a biological sample. The container includes a cap comprising a proximal open end and a sealed distal end with a lumen extending from the open end to the sealed distal end and an elongate body that extends from a handle portion to a specimen portion, wherein the specimen portion is configured to receive a biological sample thereon, further comprising a closure portion disposed between the handle portion and the specimen portion, wherein the closure portion is configured to make surface to surface contact with the cap when the specimen portion of the elongate body is fully inserted within the lumen of the cap. The closure portion comprises an outer diameter that gradually decreases in a direction from the handle portion to the specimen portion, wherein a portion of the closure portion has an outer diameter that is the same as an inner diameter forming the lumen of the cap. The specimen portion comprises an upper surface and an opposite lower surface, and the upper surface comprises a scooped portion where a distance between the upper surface and the lower surface is less than distances between the upper surface and the lower surface along remaining portions of the specimen portion, wherein the scooped portion is spaced proximally from a distal tip of the specimen portion.

Advantages of the present disclosure will become more apparent to those skilled in the art from the following description of the preferred embodiments of the disclosure that have been shown and described by way of illustration. As will be realized, the disclosed subject matter is capable of other and different embodiments, and its details are capable of modification in various respects. Accordingly, the drawings and description are to be regarded as illustrative in nature and not as restrictive.

DETAILED DESCRIPTION OF THE DRAWINGS AND THE PRESENTLY PREFERRED EMBODIMENTS

Figure 1:
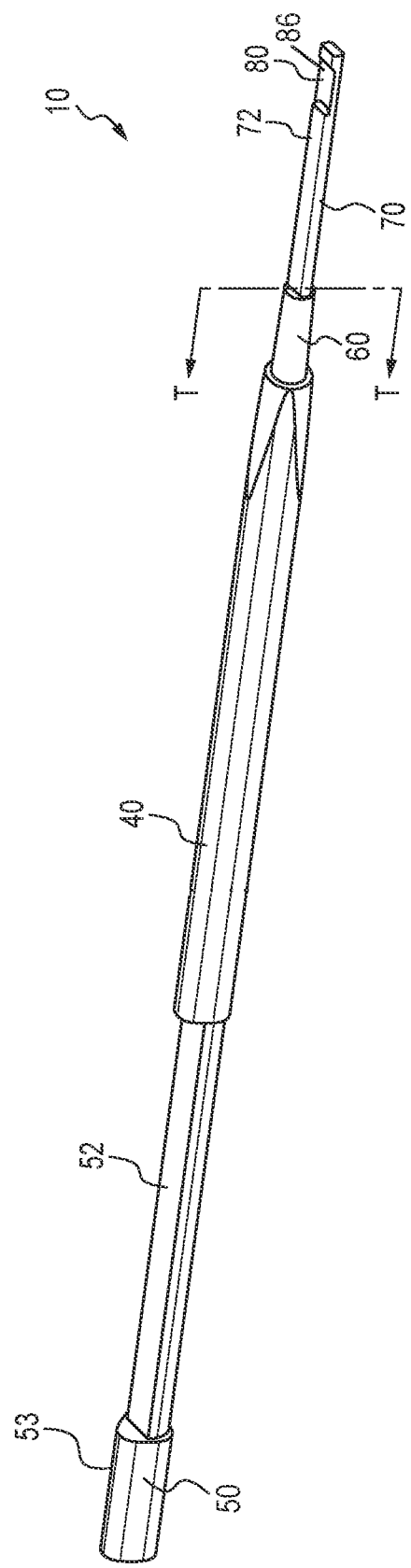
FIG. 1 is a perspective view of the elongate member of a cryopreservation device.
Figure 2:
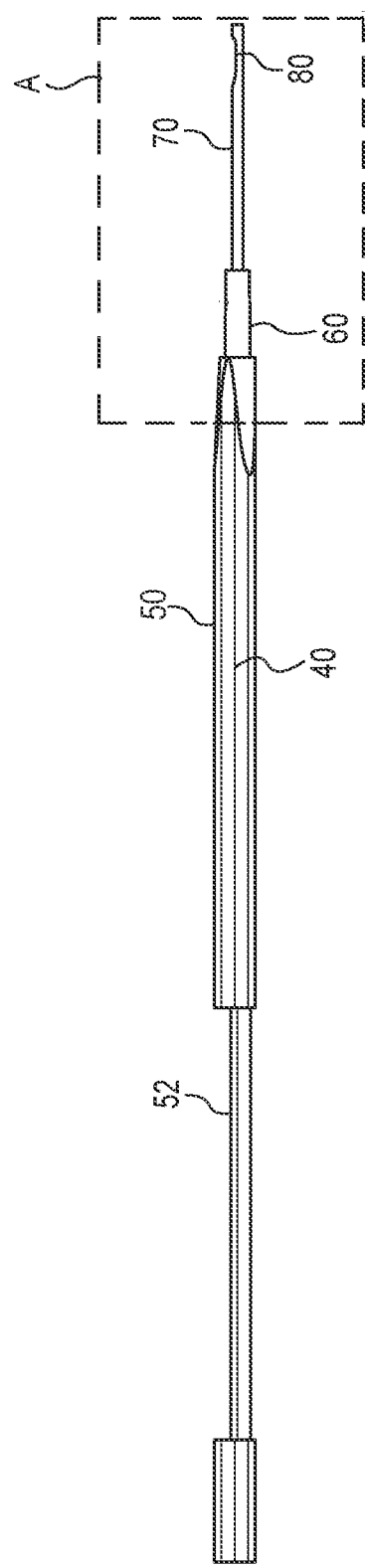
FIG. 2 is a side view of the elongate member of FIG. 1.
Figure 3:
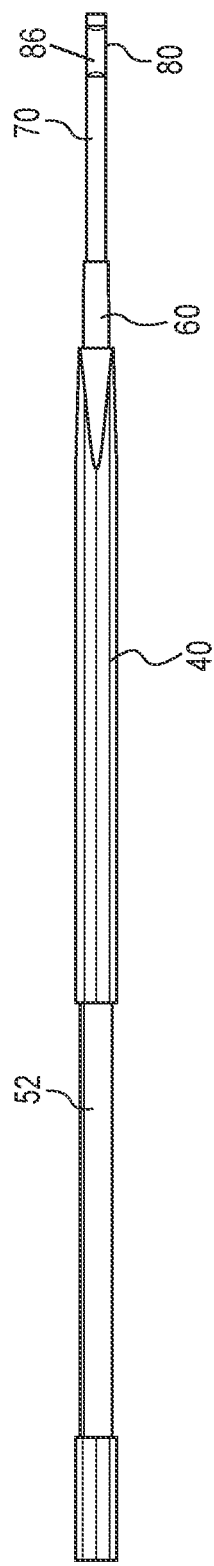
FIG. 3 is a top view of the elongate member of FIG. 1.

Turning now to FIGS. 1-11 a device 10 for receiving and storing material for cryopreservation is provided. The device 10 may be a sealable container that is configured for receipt of a biological sample, which encloses and supports the biological sample for long term receipt within a cryopreservation container, such as a dewar. The device 10 may sealably retain the biological sample with various structures as described herein.

The device 10 may include a cap 120 and an elongate body 40, wherein a portion of the elongate body 40 is inserted and extends within a lumen 132 of the cap 120. As discussed below, the elongate body has a closure portion 60 that is configured to engage the lumen 132 of the cap 120 when a specimen portion 70 of the elongate body 40 is fully inserted within the lumen 132.

Figure 7:
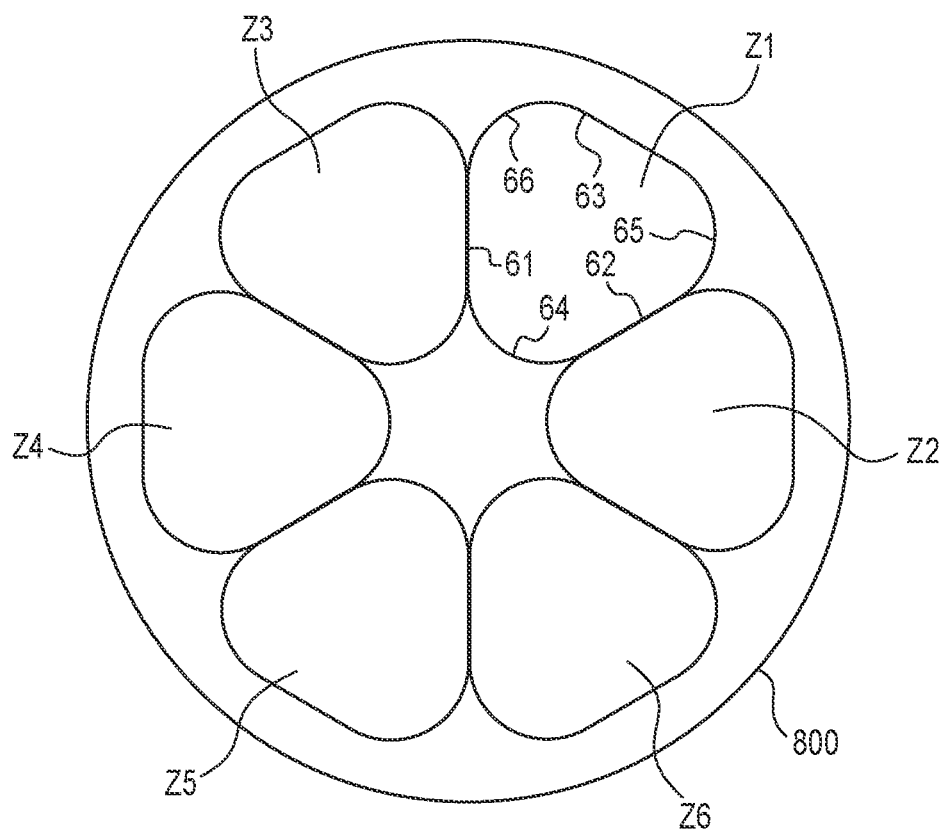
FIG. 7 is a view of six cryopreservation devices aligned within a sleeve of a cryocontainer.

The elongate body 40 is best shown in FIGS. 1-5. The elongate body 40 extends from a handle portion 50 to a specimen portion 70. The handle portion 50 is configured to be manipulated by the user, such as to insert and remove the device 10 from the cryocontainer 800 (FIG. 7). The handle portion 50 also is adapted to include biographical information about the biological specimen stored within the device 10, as discussed below. The specimen portion 70 is configured to receive and support a biological sample thereon, as can be understood, the biological sample is disposed and removed from the specimen portion 70 when uncovered, and the device 10 is configured for storage when the cap 120 is disposed upon the specimen portion 70 of the elongate member 40.

Figure 4:
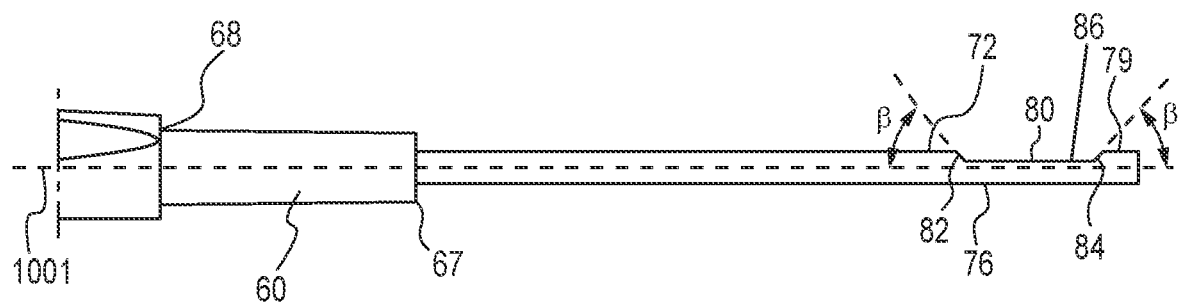
FIG. 4 is a side view of detail A of FIG. 2.
Figure 5:
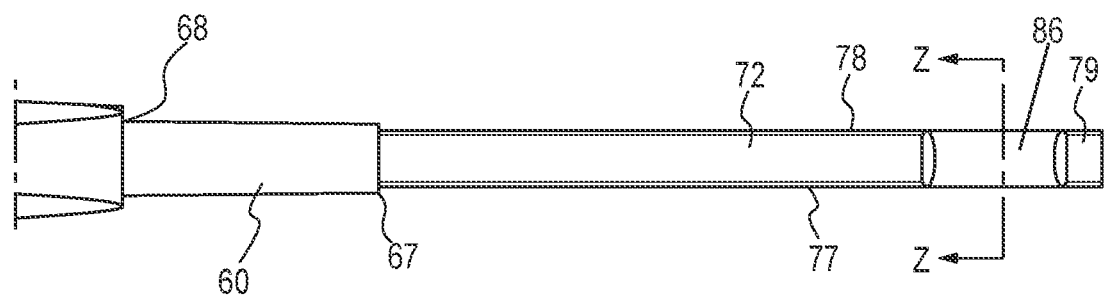
FIG. 5 is a top view of detail A of FIG. 2.

The specimen portion is best shown in FIGS. 4-5. The specimen portion 70 includes an upper surface 72 and a lower surface 76. In some embodiments, one or both the upper and lower surfaces 72, 76 are planar along at least a portion thereof. In other embodiments, one or both of the upper and lower surfaces may be arcuate. The specimen portion 70 additionally includes right and left surfaces 77,78 that bridge between opposite edges or in some embodiments end portions of the respective upper and lower surfaces 72, 76. In some embodiments, the cross-section of the specimen portion (other than the one or more specimen portions—discussed in additional detail below) may be rectangular, square, circular, elliptical or other geometries. For example, the upper and lower surfaces 72, 76 may be planar while the right and left surfaces 77, 78 may be arcuate, or vice versa.

Figure 6:
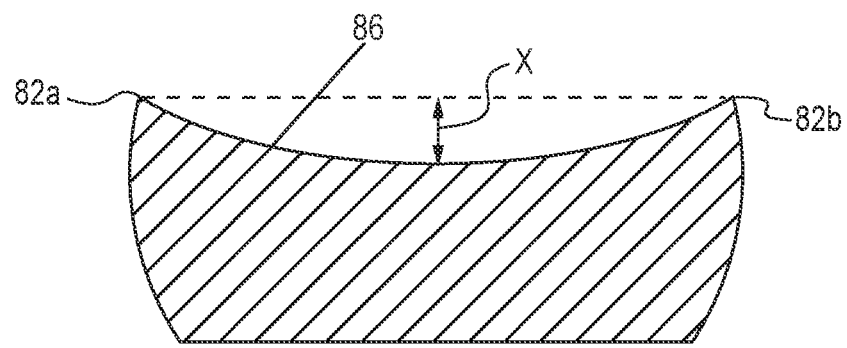
FIG. 6 is a cross-sectional view of the section Z-Z of FIG. 5.

The scooped portion 80, may be a single portion, or multiple spaced scooped portions along the length of the specimen portion 70. The scooped portion 80 may be a location where the thickness of the specimen portion 70 (as measured between the upper and lower surfaces 72, 76) is less than a thickness of other positions along the specimen portion 70. In one representative embodiment of the disclosure, the thickness of the scooped portion is 0.35 mm less than the thickness of the specimen portion 70 bordering the scooped portion 80, in other words the depth of the scooped portion in this embodiment is 0.35 mm. In some embodiments, the depth of the scooped portion is greater than the largest outer diameter of the biological sample that is expected to be positioned upon the scooped portion 80 for storage within the device 10. The scooped portion 80 includes a surface 86 upon which a biological sample rests when placed thereon. In some embodiments, the surface may be as depicted in FIG. 6, where the surface 86 is arcuate, and in some embodiments concave. In one representative embodiment, the cross-section of the scooped portion has a central point that is 0.2 mm lower than the outside edges 82a, 82b of the scooped portion, as depicted by the dimension X on FIG. 6. In some embodiments, the surface 86 of the scooped portion may have a constant profile along its length, while in other embodiments, the shape of the surface 86 may change along its length, such as a centerline of the surface 86 (that runs parallel to the longitudinal axis 1001 of the elongate member 40) is arcuate and in some embodiments concave.

The scooped portion 80 may transition from the remainder of the specimen portion 70 with side walls 82, 84. The side walls may be planar (as shown in FIG. 4) while in other embodiments, side walls 82, 84 may be arcuate. In some embodiments, the side walls 82, 84 are perpendicular to the longitudinal axis 1001 of the elongate body 40, while in other embodiments, the side walls 82, 84 may extend an acute angle β with respect to longitudinal axis 1001. The angle β may be within a range of about 15 to about 75 degrees, or about 30 to 60 degrees or about 40 degrees to about 50 degrees. The word "about" as used herein when referencing an angle is defied to include the value referenced as well as plus or minus 2.5 degrees from the reference value. In some representative embodiments, the angle β may be 40, 45, 50, degrees or other angles that may be understood by one of ordinary skill in the art after a thorough review of the subject specification and figures. In some embodiments, first and second side walls 82, 84 may be the same geometry (although facing in opposite directions) or the side walls 82, 84 may be formed from differing geometry.

In some embodiments, the scooped portion 80 is positioned proximal from a distal tip 79 of the specimen portion. In these embodiments, the cross-sectional geometry of the distal tip 79 may be the same as the cross-sectional geometry of the specimen portion 70 proximal of the scooped portion 80, or in other embodiments, the cross-sectional geometry may be different, but also different from the scooped portion. In a representative embodiment, the scooped portion may be between about 4.0 to about 6.0 mm in length, inclusive of the bounds of this ratio. The term "about" as used herein with respect to a dimension is defined as the reference dimension plus or minus 5% of the reference dimension.

As one of ordinary skill in the art will comprehend after a thorough review of the subject specification and figures, the size and dimensions of the different portions of the device 10 may vary based upon the expected size and type of the biological sample and the size of the cryocontainer.

The closure portion 60 is disposed between the handle portion 50 and the specimen portion 70. The closure portion 60 includes a gradually increasing cross-sectional geometry along its length. The closure portion 60 is positioned along the specimen portion 70 such that the inner surface of the lumen 132 of the cap 120 (discussed in further detail below) contacts the closure portion 60 when the specimen portion 70 is fully inserted within the lumen 132 of the cap 120. In some embodiments, the outer diameter of the closure portion 60 may be the same as the inner diameter of the lumen 132 of the cap 120 when the specimen portion 70 is fully inserted within the cap 120. In other embodiments, the outer diameter of the closure portion 60 is slightly larger than the inner diameter of the lumen 132 of the cap 120 when the specimen portion 70 is fully inserted. In this embodiment, the material that forms one or both of the cap and the closure portion 60 may be sufficiently soft to slightly compress, which increases the strength of the connection between the cap and the closure portion.

In some embodiments, a distal end 67 of the closure portion 60 is the same cross-sectional geometry as the specimen portion at the position where the two portions transition. In other embodiments, the closure portion 60 has a cross-sectional geometry that is larger than a cross-sectional geometry of the specimen portion in at least one aspect (e.g. thickness, width, or the like), with a step change in dimensions therebetween (including any nominal filets or curved transitions that are inherent in the manufacturing process). The specimen portion 70 and the closure portion 60 may have the same cross-sectional shape proximate to the transition between the two (as discussed above, in some embodiments with differing dimensions) or the specimen portion 70 and the closure portion 60 may be differing cross-sectional shapes proximate to the transition between the two. In the embodiment depicted in FIGS. 4-5, the closure portion 60 has a conical profile along its length, with a constant change of diameter along its length. In an exemplary embodiment, the distal end 67 has a diameter of 1.97 mm, and the diameter of the closure portion 60 increases at an angle of 1.15 degrees along its length.

Figure 10:
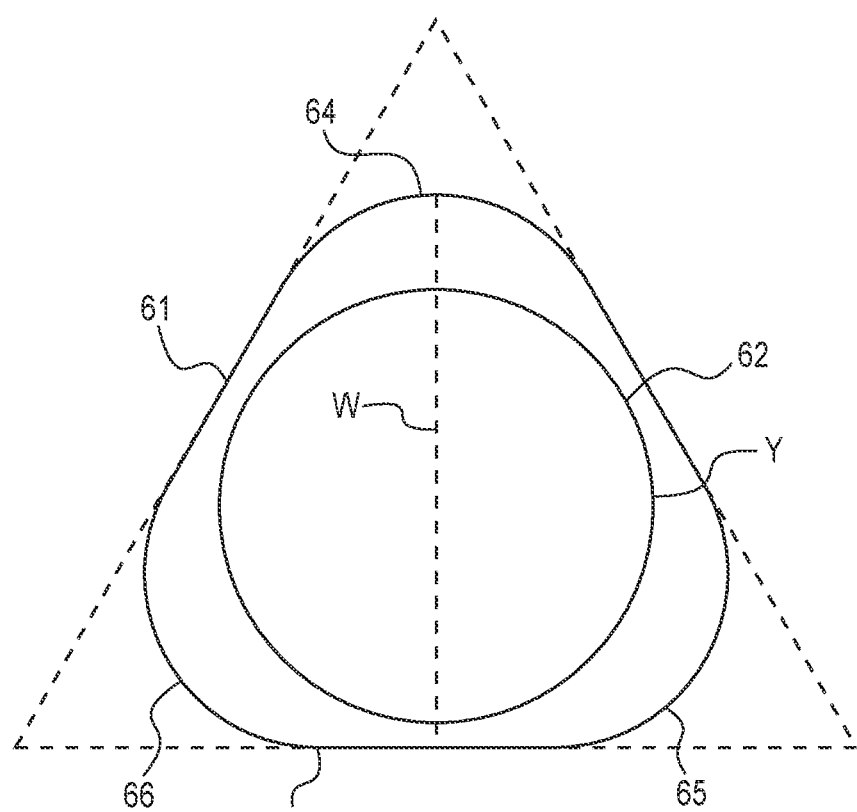
FIG. 10 is a cross-sectional view of the elongate member of FIG. 1 along section TT when the specimen portion of the elongate member is fully inserted within the cap.
Figure 11:
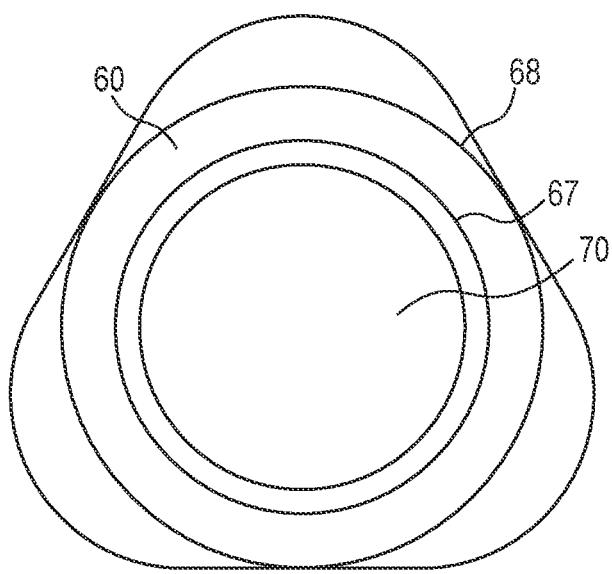
FIG. 11 is a cross-sectional view of the elongate member of FIG. 1 along section TT.

The handle portion 50 extends proximally from a proximal end 68 of the closure portion 60. The handle portion may be elongate and may include an information portion 52 and one or more ergonomic features. The handle portion 50 may have a modified triangular cross-section along its length, as shown in FIG. 10. In some embodiments, the handle portion 50 includes three planar side portions 61, 62, 63. In some embodiments, the neighboring planar side portions (e.g. 61/62, 62/63, 63/61) form an edge therebetween to form a conventional triangular cross-section (depicted by the dotted lines forming a triangle in FIG. 10).

In other embodiments, the neighboring planar side portions may transition between each other with arcuate portions 64, 65, 66 instead of extending toward each other at an edge. In some embodiments, the arcuate portions 64, 65, 66 may extend from the respective planar side portions continuously. In some embodiments, the largest diameter of the handle portion 50, i.e. from the top of one of the arcuate portions to the opposite planar side portion (line W in FIG. 10) may be about 3.39 mm. In some embodiments, the portions of the handle portion 50 that include a modified triangular cross-section may define an equilateral triangle (with arcuate portions instead of extending to points/edges of an actual equilateral triangle), such that a 60 degree angle is formed between each neighboring planar side portion 61, 62, 63. In this embodiment, the handle portions of six different devices can be positioned within a cylindrical opening of a cryocontainer 800 (such as a sleeve within a cryocontainer), as depicted in FIG. 7 (the handle portion 50 of each device being represented as Z1, Z2, etc.) with a curved portion of each device 10 pointed toward each other. In a representative embodiment, the handle portion 50 may be sized such that six devices 10 can be simultaneously positioned within a sleeve within a cryocontainer 800 that is 9 mm in diameter.

The handle portion 50 may include one or more information portions 52. The information portion 52 is configured to receive identification information regarding the biological sample that is disposed upon the scooped portion 80 of the specimen portion 70, so that the device 10, when stored in a cryocontainer with a plurality of devices, can be identified when desired. The information portion may be a recessed portion that includes a smaller outer diameter than a remainder of the handle portion 50 such that when a label is affixed to the information portion (which provides information related to the biological specimen (bar code, QR code, written information, color coding or the like) the overall cross-section of the label+ information portion 52 will be less than or equal to the cross-section of the remaining portions of the handle portion. As shown in FIG. 1, the information portion 52 may be disposed between two portions of the handle portion 50 with modified triangular profiles, as discussed above.

In some embodiments, the handle portion 50 may include one or more ergonomic features 53 such as one or more diameter transitions, one or more slots, a roughened surface finish, or the like in order to assist the user with manipulating the handle portion 50 and the elongate member 40 to position the elongate member 40 as desired or to insert the specimen portion 70 into the lumen 132 of the cap 120.

Figure 8:
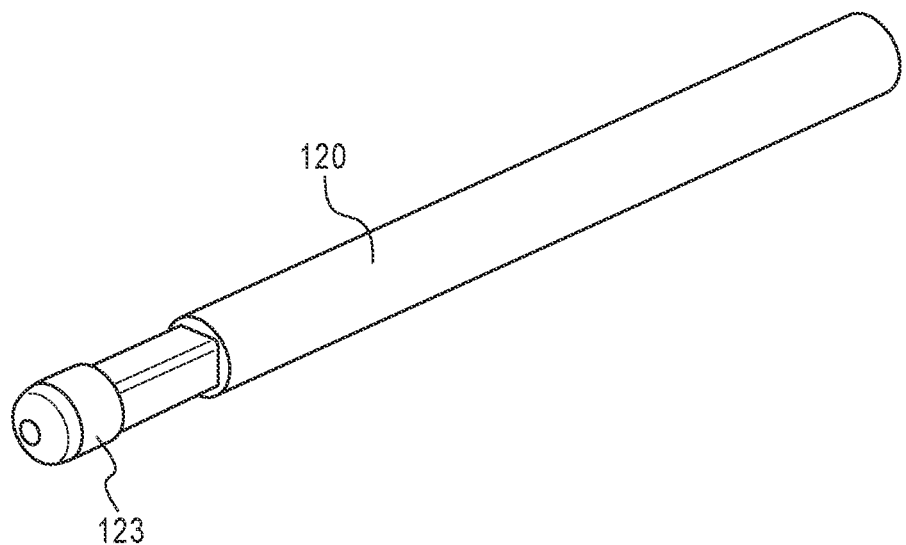
FIG. 8 is a perspective view of a cap of the cryopreservation device.
Figure 9:
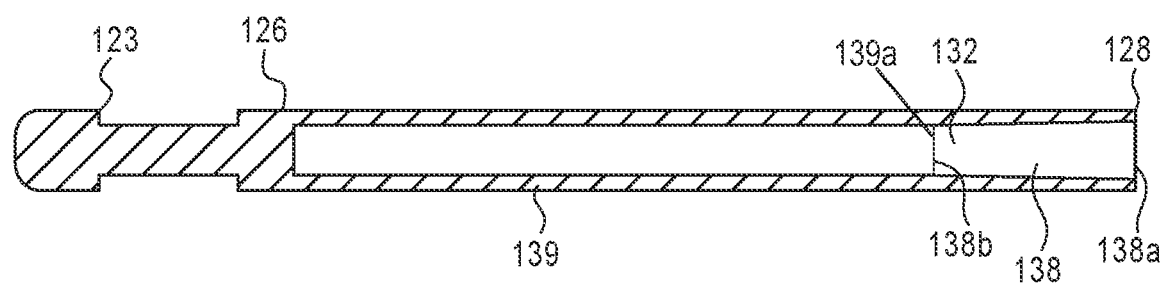
FIG. 9 is a side cross-sectional view of the cap of FIG. 8.

Turning now to FIGS. 8-9, the cap 120 is provided. The cap 120 includes an open proximal end 128 and closed end 126. The lumen 132 extends from the open proximal end 128 and extends blindly therealong toward the closed end 126. The end portion of the closed end 126 may include an ergonomic feature 123, such as one or more diameter transitions, one or more slots, a roughened surface finish, or the like in order to assist the user with manipulating the closed end 126 of the cap 120 in order to move the cap with respect to the specimen portion 70 of the elongate member 40 to allow the cap 120 to cover the specimen portion 70.

In some embodiments, the lumen 132 may be a single inner diameter along its length. In this embodiment, the inner diameter of the lumen 132 may be the same as the diameter of the closure portion 60 of the elongate member 40 at a position where the elongate member 40, and specifically the specimen portion 70 is fully inserted within the lumen 132 of the cap 120 such that the closure portion 60 and the cap 120 make surface to surface contact. In other embodiments, the diameter of the lumen 132 may be slightly smaller than the smallest diameter of the closure portion 60 (i.e. the diameter at the distal end 67 of the closure portion 60 in embodiments where the diameter of the closure portion 60 increases proximally along the closure portion 60), such that the closure portion 60 makes surface to surface contact with the lumen 132 for the entire length of the overlap between the cap 120 and the closure portion 60.

In other embodiments, the lumen 132 of the cap 120 may have one or more portions with varying diameter along its length. For example, as shown in FIG. 9, the lumen 132 has a proximal portion 138 and a distal portion 139, with the distal portion 139 positioned at the distal tip of the cap 120. In some embodiments, the proximal portion 138 may have a varying diameter along its length. In an exemplary embodiment, the proximal end 138a of the proximal portion 138 of the lumen may have a diameter that is larger than both the largest diameter of the specimen portion and the diameter of the closure portion 60 —at least at the distal end 67 of the closure portion 60. In the exemplary embodiment disclosed herein where the distal end 67 of the closure portion 60 is 1.97 mm, the proximal end 138a of the proximal portion 138 of the lumen may be 2.1 mm, to allow some play to the user in inserting the distal tip 79 of the specimen portion 70 into the lumen 132 of the cap 120.

In some embodiments, the diameter of the lumen 132 along the proximal portion 138 decreases distally along its length, such as at an angle of about 1 degree. In the representative embodiment disclosed herein the distal end 138b of the proximal portion may have an inner diameter that is 1.82 mm. In some embodiments, the distal end 138b of the proximal portion 138 may be the same diameter as the proximal end 139a of the distal portion 139 of the lumen. In some embodiments, the length of the proximal portion 138 may be slightly longer than the length of the closure portion 60, such as 7.00 mm for the proximal portion 138 and 6.5 mm for the closure portion 60.

In some embodiments, the outer diameter of the cap 120 may be smaller than the largest diameter of the elongate member 40, or in other embodiments, the outer diameter of the cap 120 may be such that the cross-section of the cap can be inscribed within the cross-section of the largest portion of the elongate member 40, which may be the handle portion 50, as shown schematically with circle Y in FIG. 10. This relative geometry ensures that when a plurality of devices 10 are positioned within the same sleeve within a cryocontainer—such as in FIG. 7, space exists between the caps 120 of neighboring devices to allow coolant, such as liquid nitrogen, to flow between the caps 120 of neighboring devices 10 to ensure uniform cooling.

While the preferred embodiments of the disclosure have been described, it should be understood that the disclosure is not so limited and modifications may be made without departing from the disclosure. The scope of the invention is defined by the appended claims, and all devices that come within the meaning of the claims, either literally or by equivalence, are intended to be embraced therein.

The invention claimed is:

1. A sealable container for preservation of a biological sample, comprising: a cap comprising a proximal open end and a sealed distal end with a lumen extending from the proximal open end to the sealed distal end;
    an elongate body that extends from a handle portion to a specimen portion, wherein the specimen portion is configured to receive a biological sample thereon, further comprising a closure portion disposed between the handle portion and the specimen portion, wherein the closure portion is configured to make surface to surface contact with the cap when the specimen portion of the elongate body is fully inserted within the lumen of the cap,
    wherein the closure portion comprises an outer diameter that gradually decreases at a first angle in a direction from the handle portion to the specimen portion, the lumen of the cap comprises an inner diameter that gradually decreases at a second angle in a direction from the proximal open end to the sealed distal end, and the first angle is greater than the second angle; and
    wherein the specimen portion comprises an upper surface and an opposite lower surface, wherein the specimen portion comprises a scooped portion where a distance between the upper surface and the lower surface is less than distances between the upper surface and the lower surface along remaining portions of the specimen portion, and wherein the scooped portion is spaced proximally from a distal tip of the specimen portion.

2. The sealable container of claim 1, wherein the upper surface of the scooped portion is arcuate along a direction perpendicular to a longitudinal axis of the elongate body and has a constant cross-section in a direction along the longitudinal axis of the elongate body.

3. The sealable container of claim 2, further comprising an angled transition between first and second ends of the scooped portion and the specimen portion.

4. The sealable container of claim 1, wherein the upper surface of the scooped portion is arcuate along a direction perpendicular to a longitudinal axis of the elongate body.

5. The sealable container of claim 1, wherein the handle portion includes a first portion that includes a triangular profile with first, second, and third planar sides arranged along a respective different side of the triangular profile, wherein the triangular profile includes curves between adjacent planar sides of the triangular profile, and wherein both ends of each curve extend continuously from each respective end of each respective planar side.

6. The sealable container of claim 1, wherein the handle portion includes a recessed portion disposed therealong.

7. The sealable container of claim 6, wherein the recessed portion is disposed between opposite portions with triangular profiles.

8. The sealable container of claim 1, wherein the inner diameter of the lumen of the cap increases from the sealed distal end to the proximal open end.

9. The sealable container of claim 1, wherein the upper surface of the scooped portion is planar.

10. The sealable container of claim 1, wherein the closure portion transitions to the specimen portion with a first step change in outer diameter.

11. The sealable container of claim 10, wherein the closure portion transitions to the handle portion with a second step change in outer diameter.

\* \* \* \* \*